(12) United States Patent
Spear

(10) Patent No.: US 6,328,361 B1
(45) Date of Patent: Dec. 11, 2001

(54) TOOL WITH REMOVABLE HANDLE

(75) Inventor: Kenneth J. Spear, Vienna, WV (US)

(73) Assignee: Ames True Temper, Inc., Camp Hill, PA (US)

( * ) Notice: Subject to any disclaimer, the term of this patent is extended or adjusted under 35 U.S.C. 154(b) by 0 days.

(21) Appl. No.: 09/456,840

(22) Filed: Dec. 7, 1999

(51) Int. Cl.[7] .................................. A01B 1/22; B25G 3/28
(52) U.S. Cl. .............................. 294/57; 403/356; 403/361
(58) Field of Search .................. 294/49, 54.5, 57; 15/145; 16/110.1, 422; 403/105, 243, 276, 280, 282, 341, 345, 355–358, 361, 375–377, 315–319

(56) References Cited

U.S. PATENT DOCUMENTS

| | | | |
|---|---|---|---|
| 986,761 | * 3/1911 | Roscoe | 403/341 |
| 3,177,026 | * 4/1965 | Cowan | 294/57 X |
| 3,198,565 | * 8/1965 | Ellis | 294/57 X |
| 4,224,786 | * 9/1980 | Langlie et al. | 403/361 X |
| 4,406,559 | * 9/1983 | Geertsema et al. | 294/57 X |
| 4,892,434 | * 1/1990 | Miller | 403/361 |
| 5,272,788 | * 12/1993 | Gilstrap | 403/356 X |
| 5,927,779 | * 7/1999 | Aquilina | 294/57 X |

* cited by examiner

Primary Examiner—Johnny D. Cherry
(74) Attorney, Agent, or Firm—Pillsbury Winthrop LLP

(57) ABSTRACT

A garden tool of the type having a shaft handle includes a tool with a handle socket provided with an array of teeth to interengage an array of teeth formed on a lug fastened on the handle shaft so that when the end of the shaft is inserted into the handle socket on the tool, the teeth of the socket will mesh with the teeth of the lug to anchor the shaft in the socket.

12 Claims, 4 Drawing Sheets

TOOL WITH REMOVABLE HANDLE

FIELD OF THE INVENTION

This invention relates to improved structure for assembly of a garden type tool handle shaft and tool that will facilitate storage and transportation of the tool provided with this improvement. More specifically, the invention relates to an anchoring structure provided on the shaft socket of a tool for receiving one end of the handle shaft with the handle shaft being provided with an anchoring element for cooperating with the anchoring structure adjacent the socket of the shaft.

BACKGROUND OF THE INVENTION

In the manufacture of a number of items for retail sale, economic considerations relating to the storage as well as shipping and assembly of the items have been important factors in the design of such items. The reason for this is that storage space is often at a premium for retail merchants so that any reduction in the storage space required for an item will reduce the cost of the items to the retailer and even the consumer. This is particularly applicable to seasonal tools such as rakes and snow shovels. With the cost of transportation of products from the factory to retailers increasing, it has long been desired to improve the design of the tool structure of products to enable them to be more compactly stored for shipment as well as to allow storage and handling of the tools in a manner that will not adversely affect their function and appearance.

A number of tool structures that have been in use have not been successfully structured to allow compact shipment on the one hand or secure and reliable assembly for use, on the other hand. One structural problem that is particularly troublesome involves tool products that must withstand severe and repeated forces when put to use by a customer. This has been particularly true with tools that undergo repeated or periodic forces in substantially the same direction in operation but which vary in magnitude depending on the user or the material being worked upon. As a consequence, manufacturers have tended to forego compact shipping design considerations when manufacturing such tools or articles in order to provide a reinforced structure that will withstand such forces as may be imposed by a user. This has tended to increase the cost of the tool to the consumer.

SUMMARY OF THE INVENTION

The present invention is directed to a tool structure of the type using an elongated shaft which the user grasps to employ the tool to carry out functions such as gardening, cleaning and the like. In structuring the tool, an improved anchor for the shaft in a socket of the tool such as a shovel or rake is provided. In one embodiment, a portion of an anchor is mounted on the shaft adjacent one end of the tool shaft and a complimentary anchor socket is provided on the shaft socket of the tool. This allows the shaft and tool to be shipped out unassembled to a site such as a retail outlet. The retailer may then store the two parts using a nesting technique which is typically more efficient than segregated item by item storage techniques commonly employed. When appropriate, the retailer may then assemble a needed number of the items by inserting the shaft into the socket of the tool to engage the anchoring elements which hold the shaft and tool in the assembled relation. Preferably, the anchor is fashioned in a manner with improve resistance to separation when the assemble tool is put to use. The anchor may vary slightly for different uses for different tools such as in the material used to construct the anchor elements.

In one embodiment, the socket of a tool, which normally receives a shaft, which may be cylindrical or square in cross section, is modified to provide an anchor element in the form of a reception portion. The anchor reception portion is provided with engaging teeth which will be angled away from the direction of the greatest force in a direction the tool is designed to experience. A mating anchoring element is attached to the surface of the shaft generally parallel to the longitudinal axis of the shaft and has teeth angled to mate with the teeth of the reception portion. Assembly is achieved by inserting the shaft into the socket of the tool to bring the anchoring elements into mutual engagement with the teeth of each element becoming engaged such as by local deformation.

An advantage of this arrangement is that the anchoring elements can be manufactured either to prevent disassembly or to allow releasable assembly depending on the intended use of the tool. For example, a lawn rake is a type of tool that does not require permanent assembly since its use is generally seasonal so that storage is typically desired by a user. For such a tool, the set of anchoring elements may be formed with yieldable material that will allow disassembly for storage. A shovel may require permanent assembly once purchased and the material of the anchor elements will be selected to that end.

BRIEF DESCRIPTION OF THE DRAWINGS

The foregoing and other advantages of the present invention will become apparent as consideration is given to the following detailed description taking in conjunction with the accompanying drawings, in which.

DETAILED DESCRIPTION OF THE INVENTION

Figure 1:
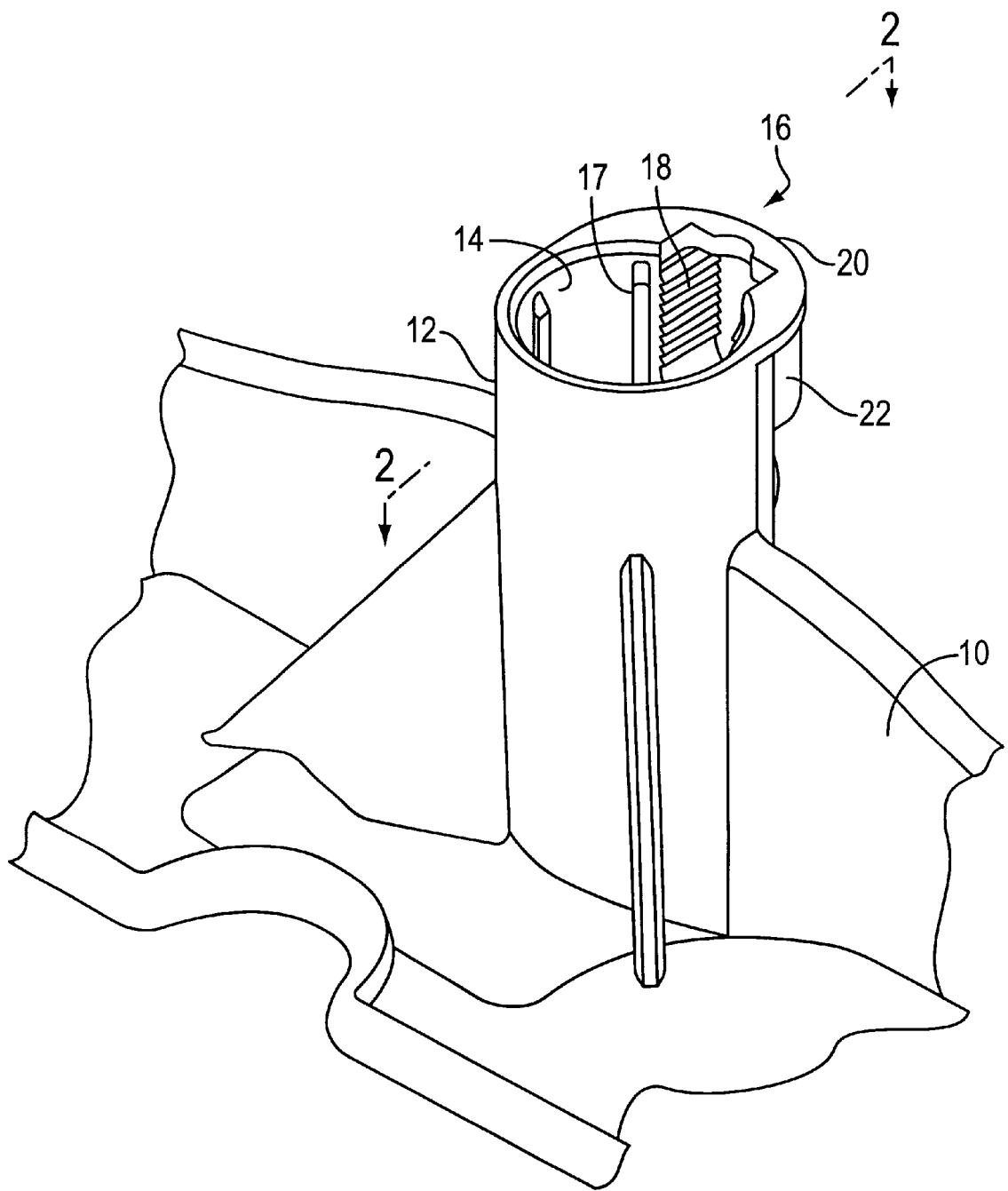
FIG. 1 is a perspective view from above of the shaft socket according to the present invention.
Figure 3:
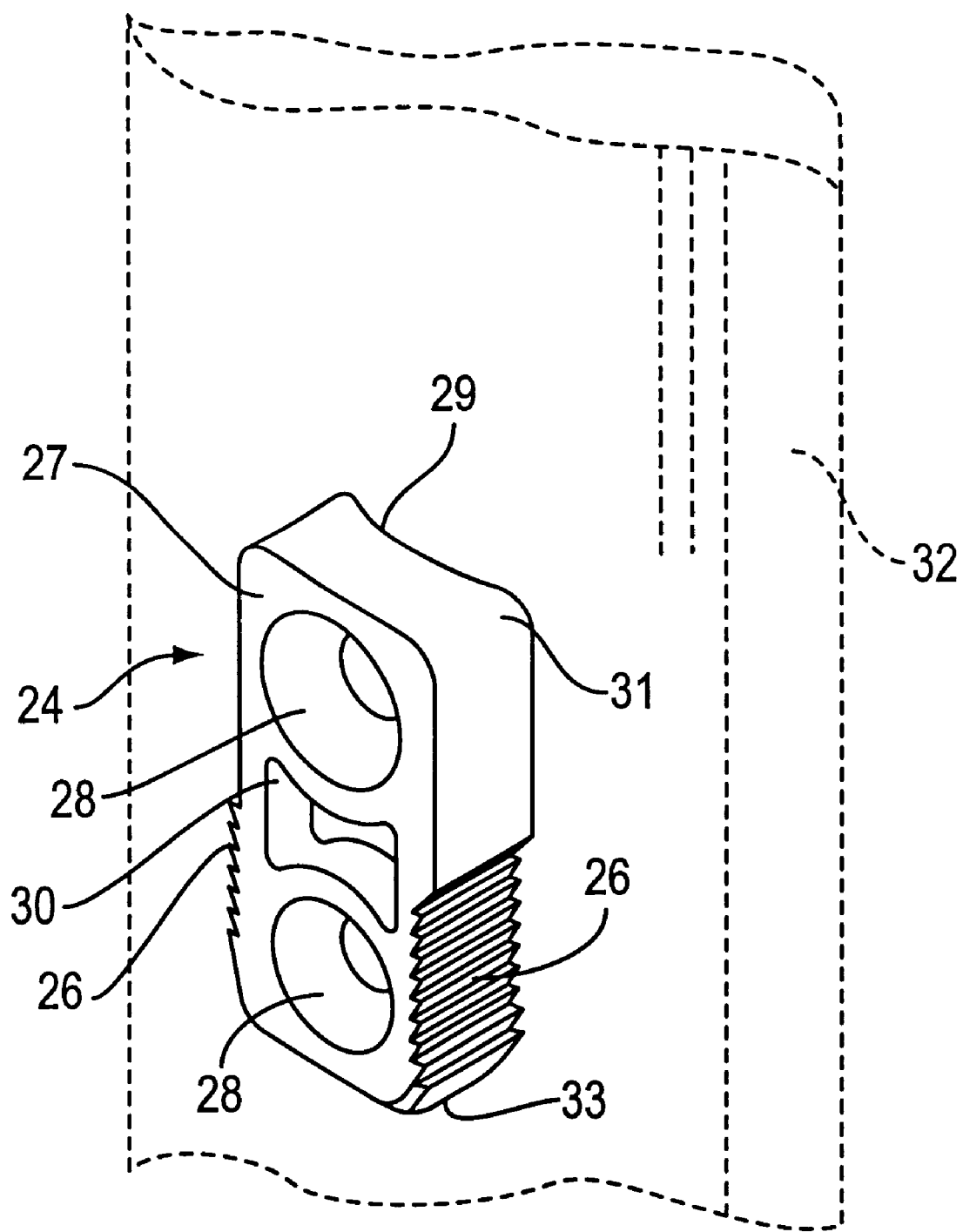
FIG. 3 is a perspective view of an anchoring element useful in the present invention.

Referring to the drawings, there is shown in FIG. 1, a portion of the base of a snow shovel 10 including a socket 12 having an interior 14 for receiving one end of a handle shaft (32 in FIG. 3). In the illustrated form, it will be appreciated that the shaft will be in the form of a cylinder or rod having an exterior diameter to form an interference fit with the inner edges of ribs 17 which project radially inwardly of interior surface 14 of the socket 12. As is conventional, these structures are formed by molding techniques that are well known and, hence, will not be described. An anchoring element generally designated at 16 is formed integrally adjacent the outer end of the handle shaft socket 12 of the tool 10. In one embodiment, the anchoring element comprises facing sets of the teeth formed on the facing walls 22 that extend substantially perpendicular to the axis of handle socket 12. The spacing between walls 22 is selected to allow insertion and an interference type fit with the teeth of an insertion lug 24 (FIG. 3) as described below. The lug 24 is securely attached to the exterior surface of the shaft 32 of the tool. The manner of attachment of the insertion lug 24 will vary depending upon the type of material from which the shaft 32 is made. For example, for a plastic, polyethylene rod, the lug 24 may be simply secured by an epoxy glue. For a metal shaft, screws or rivets should be employed.

Figure 2:
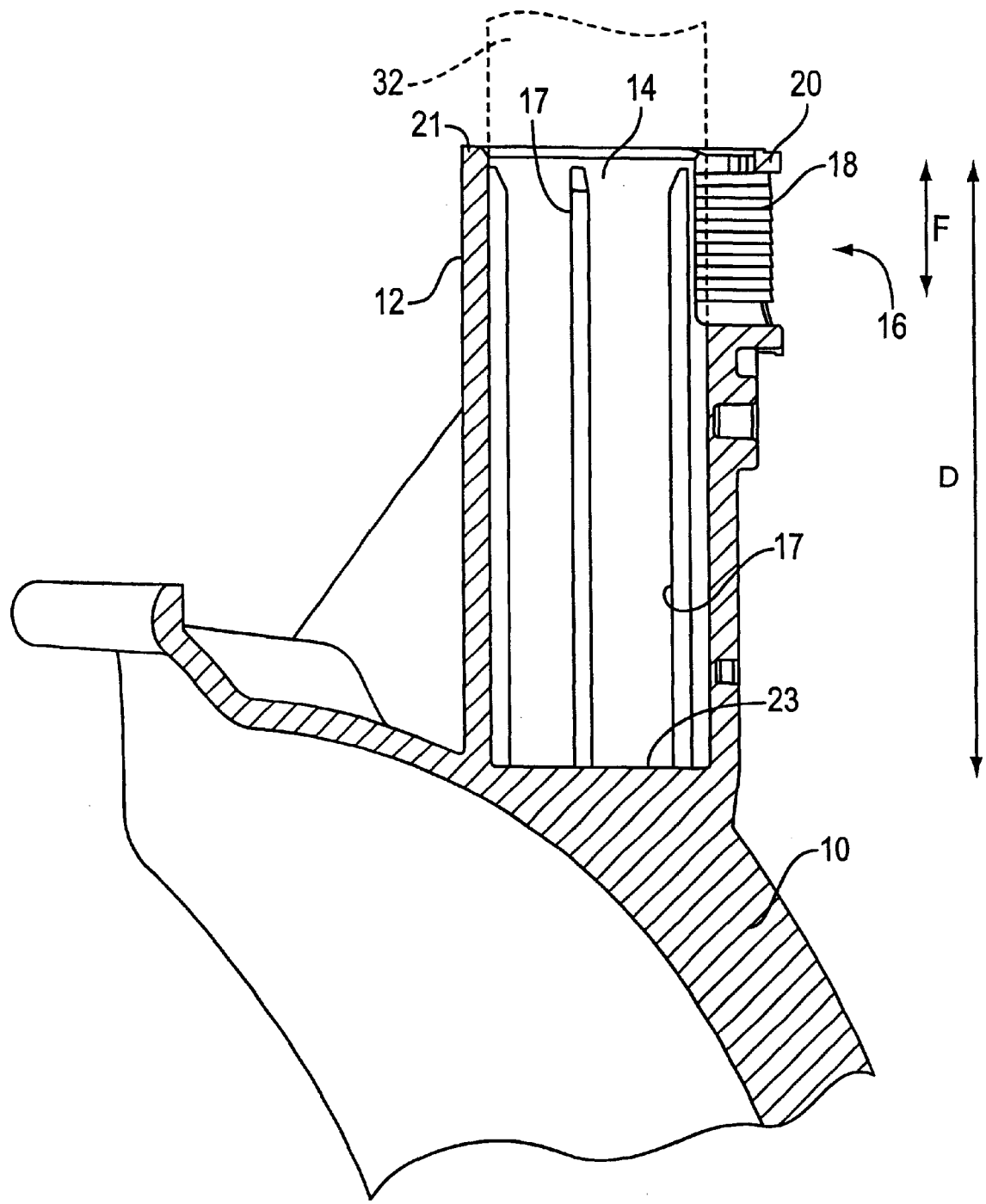
FIG. 2 is a sectional view along lines 2—2 of FIG. 1.

Referring to FIG. 2, it will be seen that the anchoring element 16 is located adjacent the upper end 21 of the socket 12 and that a distance D is provided from the upper end 21 to the base 23 of the socket 12. The distance D is several times greater than the length F of the anchoring engaging teeth portion 18 of the anchoring element 16. Preferably, D is at least twice the length F. With this provision, much greater stability for the handle and tool 10 will be achieved since the ribs 17 in cooperation with socket 12 will maintain the shaft 32 in a relatively stable position with the locking teeth 18 and 26 operable substantially to prevent movement parallel to the longitudinal axis of the socket 12. The ribs 17 will absorb substantially all other motions that would tend to distort the anchoring element surfaces such as the teeth 26 on the lug 24 and the teeth 18 of the anchoring element 16. While the longitudinal length of the face of the teeth 18 may be very large in consideration of the estimated magnitude of the force expected to be experienced by the tool, in use, it has been found that the provision of a relatively small longitudinal dimension for the teeth faces 18 in combination with a relatively long dimension for socket 12 as shown in FIG. 2 provides good retention force for the shaft in the socket 12. Thus, a major portion of the force experienced in use will be borne by the wall of socket 12 and not by the lug 24 which will experience substantially only force along a direction parallel to the axis of socket 12.

Figure 4:
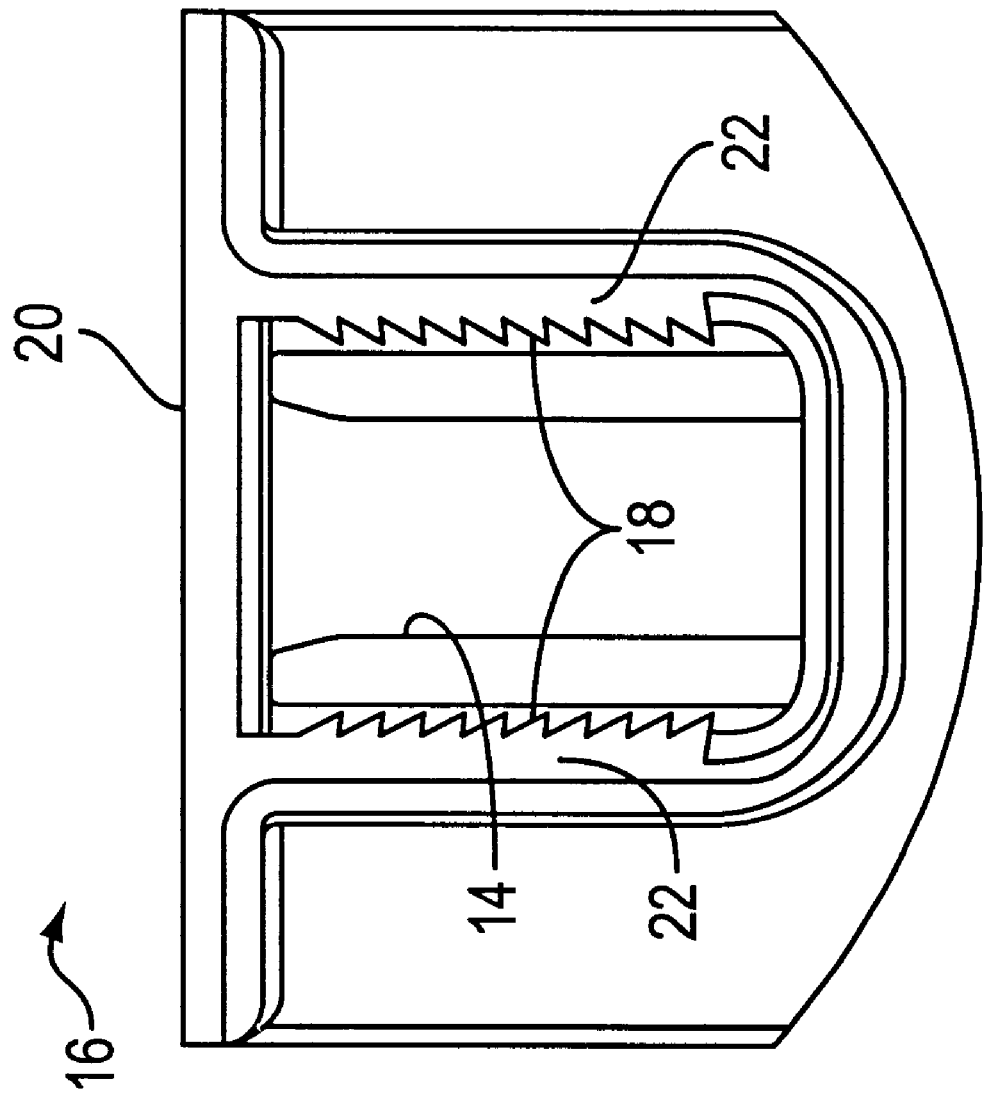
FIG. 4 is a detailed view of the anchoring element of FIGS. 1 and 2.

Referring now to FIGS. 3 and 4, there are shown detailed views of the anchoring lug 24 and the handle socket 16 which may be formed integrally with the shaft socket 12 on the tool 10. In FIG. 3, it will be seen that the lug 24 is provided with a front face 27 and a curved rear face 29 and side faces 26, a lower portion of each of which is provided with ridges in the form of teeth which extend perpendicular to the faces 27 and 29. A shown in FIG. 3, the ridges 26 are angled upwardly in contrast to the complementary ridges or teeth 18 shown in FIG. 4 in anchoring element 16. The lug 24 may be attached to a shaft 32 in any suitable manner such as by screws inserted into the openings 28.

By properly establishing by design the distance above the end of the shaft 32 at which the lug 24 is fastened to the shaft 32, the advantages of stable attachment by use of the anchoring element 16 and lug 24 with the socket 12 will be achieved. Preferably, the faces 27 and 29 of the lug 24 are tapered from the upper end 31 to the lower end 33 of the lug 24 to facilitate insertion of the lug into the anchoring element 16. The side walls 26 are preferably parallel although in some applications a slight taper to these walls may also be useful. Clearly, where the shaft 32 is rectangular and the surface to which the lug 24 is to be attached is flat the rear face 29 of the lug 24 will also be flat.

As shown in FIG. 4, the anchoring element 16 is provided with two sets of teeth 18 provided with ridges each angled downwardly to provide secure interlocking with the upwardly angled teeth of the side walls 26 of the lug 24. Where the elements are made out of a material that tend to deform such as a plastic such as nylon, secure interengagement is assured with this configuration since the tips of the ridges 18 and 26 can flex sufficiently to allow substantially full insertion of the lug 24 into the cavity of the socket 16 defined by the spaced apart sets of teeth 18. Also, by providing the ridges 26 over only the lower portion of the lug 24, disengagement of the lug 24 from the anchoring element 16 can be achieved where the 18 elements are made of nylon. This is effected by simply tilting the shaft 32 slightly while holding the shovel 10 stationary by foot. Accidental disengagement is resisted by the provision of the bridge 20 which extends from one side to the opposite side of the handle socket 16 and is located at the upper end of the element 16 above the teeth 18 as shown in FIG. 4.

While the foregoing is an advantageous form of the invention especially for a snow shovel molded from plastic such as nylon, minor modifications can render the tool capable of more strenuous applications. For example, by making the shovel and socket 12, anchoring element 16 and lug 24 of a metal such as bronze or steel, a substantially permanent connection between the shaft and the socket 12 can be achieved. Also, the anchoring element 16 and lug 24 need not be made of the same material as the tool but may be made of metal while the tool is molded from a plastic as above.

Having described invention, it will be apparent to those skilled in this art that various modifications may be made thereto without departing from the spirit and scope of this invention as defined in the appended it claims.

What is claimed is:

1. A tool and a handle for said tool, said handle having opposite ends, said tool including a socket for receiving one of said opposite ends, anchoring apparatus for locking said handle in said socket of said tool, said anchoring apparatus comprising a handle socket on said tool and an insertion member on said handle adjacent said one of said opposite ends, said handle socket and said insertion member each having surface portions from which extend interengaging members which engage when said insertion member is inserted into said handle socket to prevent relative movement between said handle and said tool at least along an axis parallel to an axis along which said insertion member is moved to effect insertion into said handle socket.

2. The invention as claimed in claim 1 wherein said insertion member is located at a distance from said one of said opposite ends of said handle so that said handle is insertable into said socket of said tool a selected distance to prevent significant movement of said handle in said tool socket.

3. The invention as claimed in claim 2 wherein said tool is a shovel formed from plastic and said anchoring apparatus is formed from the same plastic.

4. The invention as claimed in claim 1 wherein said handle is a shaft having a longitudinal axis and said insertion member is a block having a front face and a rear face, said rear face being shaped to conform to the shape of the surface of said shaft, and side faces extending between said front and rear faces.

5. The invention as claimed in claim 4 wherein said front and rear faces taper toward each other so that the distance between said faces is smallest at one end of said block that is closest to said one of said opposite ends of said handle.

6. The invention as claimed in claim 5 wherein said tool is a shovel formed from plastic and said anchoring apparatus is formed from the same plastic.

7. The invention as claimed in claim 6 wherein said plastic is nylon.

8. The invention as claimed in claim 1 wherein said tool is a shovel formed from plastic and said anchoring apparatus is formed from metal.

9. The invention as claimed in claim 8 wherein said metal is bronze.

10. The invention as claimed in claim 1 wherein said tool is a shovel formed from plastic and said anchoring apparatus is formed from a different plastic.

11. The invention as claimed in claim 1 wherein said interengaging members comprise teeth having edges extending generally parallel to each other and transverse to the direction of insertion of said insertion member in said handle socket.

12. The invention as claimed in claim 11 wherein said teeth of said insertion member extend from said respective surface portion in one direction and said teeth of said handle socket extend from said respective surface portion in a direction away from said one direction.

* * * * *